Patented Nov. 29, 1932

1,889,303

UNITED STATES PATENT OFFICE

OTTO WULFF, OF HOFHEIM-IN-TAUNUS, GERMANY, ASSIGNOR TO I. G. FARBENINDUSTRIE AKTIENGESELLSCHAFT, OF FRANKFORT-ON-THE-MAIN, GERMANY

NITRO-β-HYDROXYPYRIDINE AND NITRO-β-HYDROXYALKYLPYRIDINE AND PROCESS OF PREPARING THEM

No Drawing. Application filed September 29, 1930, Serial No. 485,311, and in Germany November 7, 1929.

The present invention relates to nitro-β-hydroxypyridine and nitro-β-hydroxyalkylpyridines and process of preparing them.

I have found that β-hydroxypyridine of the formula:

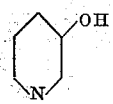

can be converted into a mononitro-β-hydroxypyridine by dissolving the substance in an inorganic acid having a dehydrating action such as concentrated sulfuric acid or phosphoric acid, and by causing the solution to react with a nitrating agent, such as concentrated nitric acid, nitrating acid (a mixture of strong nitric acid and sulfuric acid) or a nitrate which may be dissolved in sulfuric acid. The process can practically be carried out at a temperature up to about 110° C.

The nitration likewise succeeds when starting from the homologues of the β-hydroxypyridine having the formula:

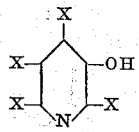

wherein at the most two X's may stand for alkyl groups, the other X's being hydrogen atoms; for instance the β-hydroxy-α-picoline prepared for instance according to the process described in my co-pending U. S. application Serial No. 405,289, filed on November 6, 1929. The new nitro compounds are slightly yellow solid compounds soluble in strong acids and give deeply colored solutions in alkalies.

The nitro group thus introduced may be subjected to any desired conversion, for instance by way of the amino group. The process of introducing a nitro-group into the β-hydroxypyridine thus becomes an easy method for making derivatives of β-hydroxypyridine.

The following examples serve to illustrate the invention but they are not intended to limit it thereto:

(1) 14.5 grams of β-hydroxypyridine are gradually introduced at $-5°$ C., while stirring, into 105 cc. of concentrated sulfuric acid cooled by means of a freezing mixture; 36 grams of nitrating sulfuric acid containing 30 per cent. of nitric acid are then gradually added drop by drop, the temperature being allowed slowly to rise to 35° C.

The reaction mass is stirred in ice water and neutralized with caustic soda solution. The nitrohydroxypyridine partly separates in yellow crystals; a further portion can be obtained from the filtrates. The total yield of nitrohydroxypyridine amounts to 10 grams = 50 per cent. of the theory.

The nitro-β-hydroxypyridine very readily dissolves in hot water and separates again when the solution is cold in the form of very fine light-yellow crystals. The melting point lies at 68° C.–69° C. The substance is readily soluble in alcohol, ether and benzene. By reduction a well crystallizing amino-β-hydroxypyridine is obtained which melts at 163° C. and readily dissolves in water and alcohol. The amino-β-hydroxypyridine couples well with diazo solutions, furthermore it can itself be readily diazotized. The aqueous solution of the amino-hydroxy compound reduces ammoniacal silver solution. With ferric chloride a bluish coloration is obtained.

(2) 24 grams of β-hydroxypyridine are introduced, while stirring, into 180 cc. of concentrated $H_2SO_4$; during this process the temperature gradually rises to about 30° C. 60 grams of nitrating acid containing 30 per cent of nitric acid are then slowly added drop by drop at 50° C., the whole is stirred for a quarter of an hour at 50° C.; it is then allowed to cool and introduced, while stirring, into ice water.

When the product has been worked up 20 grams of nitro-β-hydroxypyridine=57 per cent. of the theory are obtained. Melting point: 68° C.–69° C. The product is identical with the body obtained according to Example 1. If the nitration is carried out at 100° C. while observing the same conditions of working, nitro-β-hydroxypyridine is obtained with a yield of 5 per cent. of the theory.

(3) 109 grams of β-hydroxy-α-picoline=1 mol. are introduced at −5° C. into 700 cc. of concentrated sulfuric acid while cooling by means of a freezing mixture; 235 grams of nitrating sulfuric acid containing 30 per cent of nitric acid are then added drop by drop in the course of one hour at −5° C. and the whole is stirred for half an hour at 0°. The mass is then stirred in ice during which operation the nitro-β-hydroxy-α-picoline immediately separates nearly completely in the form of feebly yellow crystals. A small portion can still be obtained from the mother liquor by neutralizing it with caustic soda solution.

The yield is nearly quantitative.

The nitro-β-hydroxy-α-picoline is very difficultly soluble in cold water, but easily soluble in boiling water, the solution showing a strongly acid reaction. The substance readily dissolves in cold sodium carbonate solution to a reddish-yellow solution. The substance is readily soluble in warm alcohol from which is recrystallizes on cooling; the behavior towards benzene is similar. The substance is sparingly soluble in ether. The melting point is at 107° C.–108° C.

By reduction a finely crystallizing amino-β-hydroxy-α-picoline melting at 153° C. can easily be obtained. Said product is readily soluble in water and alcohol, but rather difficultly soluble in ether and benzene. It is precipitated from its aqueous solution on addition of sodium chloride. The amino-β-hydroxy-α-picoline couples well with diazo-solutions and can itself easily be diazotized. The aqueous solution reduces ammoniacal silver solution. With ferric chloride a greenish-blue coloration is obtained.

(4) If the operation is similar to that described in Example 3, with the exception that the nitration is carried out at 50° C., the same nitro-β-hydroxy-α-picoline with the same good yield is obtained.

By nitrating β-hydroxy-α-picoline at 105° C., the product is obtained with a yield of 25 per cent. of the theory.

(5) By replacing in Example 3 the 235 grams of nitrating acid of 30 per cent. strength by 80 grams of nitrating acid of 88 per cent. strength, the same nitro body with the same good yield is obtained.

(6) 35 grams of pulverized potassium nitrate are slowly introduced at −5° C. into a solution of 27 grams of β-hydroxy-α-picoline in 200 cc. of concentrated $H_2SO_4$, while cooling. The whole is stirred for half an hour at 0°. If the product is worked up as described in Example 3, 19 grams of nitro-β-hydroxy-α-picoline (melting point 107° C.)=50 per cent. of the theory are obtained.

(7) 16.5 grams of 3-hydroxy-4-picoline (obtainable according to the process of my co-pending U. S. application mentioned above) are introduced at −5° C. into 105 cc. of concentrated $H_2SO_4$, while cooling. 35 grams of nitrating acid containing 30 per cent of nitric acid are slowly added drop by drop and the whole is stirred for half an hour at 0°. After the mass has been introduced into ice water, while stirring, the greater part of the nitro body separates, while a further portion is obtainable from the mother liquor. The total yield amounts to 17 grams=75 per cent. of the theory.

The nitro-3-hydroxy-4-picoline forms weakly yellowish crystals having a melting point of 88° C.–89° C. The properties as to solubility are analogous to those of the corresponding α-picoline derivative.

(8) By replacing in Example 7 the 16.5 grams of 3-hydroxy-4-picoline by 19.5 grams of 3-hydroxy-2-methyl-5-ethyl-pyridine (obtainable according to the process described in my co-pending U. S. application mentioned above) and working otherwise as it is described in Example 7, 10 grams of nitro-3-hydroxy-2-methyl-5-ethyl-pyridine=40 per cent. of the theory are obtained.

The melting point lies at 162° C.–165° C. The product represents weakly yellowish laminated crystals which are very difficultly soluble even in boiling water and can easily be recrystallized from alcohol.

I claim:

1. The process which comprises causing a nitrating agent to act upon a compound of the following formula:

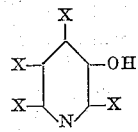

wherein at the most two X's may stand for alkyl groups, the other X's being hydrogen atoms being dissolved in an inorganic acid capable of binding water.

2. The process which comprises causing a nitrating agent to act upon a compound of the following formula:

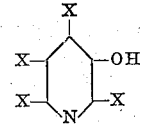

wherein at the most two X's may stand for alkyl groups, the other X's being hydrogen atoms being dissolved in concentrated sulfuric acid.

3. The process which comprises causing nitric sulfuric acid to act upon a compound of the following formula:

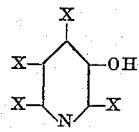

wherein at the most two X's may stand for alkyl groups, the other X's being hydrogen atoms being dissolved in an inorganic acid capable of binding water.

4. The process which comprises causing nitric sulfuric acid to act upon a compound of the following formula:

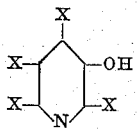

wherein at the most two X's may stand for alkyl groups, the other X's being hydrogen atoms being dissolved in concentrated sulfuric acid.

5. The process which comprises causing nitric sulfuric acid to act upon β-hydroxy-pyridine being dissolved in concentrated sulfuric acid.

6. As new products, compounds of the following formula:

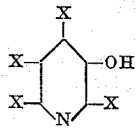

wherein one X stands for the nitro group and at the most two X's may stand for alkyl groups, the other X's being hydrogen atoms, said products being slightly yellow solid compounds soluble in strong acids and giving deeply colored solutions in alkalies.

7. As a new product, the nitro compound of β-hydroxy-pyridine showing a melting point of 68° C.–69° C.

8. As new products, the nitro compounds of β-hydroxy-alkyl-pyridines, said products being slightly yellow solid compounds soluble in strong acids and giving deeply colored solutions in alkalies.

9. As a new product, the nitro compound of β-hydroxy-α-picoline, showing a melting point of 107° C.–108° C.

10. As a new product, the nitro compound of β-hydroxy-γ-picoline, showing a melting point of 88° C.–89° C.

In testimony whereof, I affix my signature.

OTTO WULFF.